(12) United States Patent
Nakamura et al.

(10) Patent No.: US 7,777,874 B2
(45) Date of Patent: Aug. 17, 2010

(54) NONCONTACT SURFACE FORM MEASURING APPARATUS

(75) Inventors: Katsushige Nakamura, Tokyo (JP); Katsuhiro Miura, Tokyo (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 0 days.

(21) Appl. No.: 12/107,991

(22) Filed: Apr. 23, 2008

(65) Prior Publication Data
US 2008/0266569 A1 Oct. 30, 2008

(30) Foreign Application Priority Data
Apr. 24, 2007 (JP) ............... 2007-114460

(51) Int. Cl.
*G01N 21/00* (2006.01)
(52) U.S. Cl. .............. 356/237.2; 356/124; 356/445; 356/512; 359/368; 359/812
(58) Field of Classification Search ... 356/237.1–237.6, 356/400, 445, 601–623, 124–127, 512; 359/368, 359/812
See application file for complete search history.

(56) References Cited

U.S. PATENT DOCUMENTS

| | | | | |
|---|---|---|---|---|
| 4,854,702 A | * | 8/1989 | Stieff ...................... | 356/155 |
| 6,078,380 A | * | 6/2000 | Taniguchi et al. ............ | 356/400 |
| 6,649,893 B2 | * | 11/2003 | Fujimoto et al. ......... | 250/201.2 |
| 7,209,242 B2 | | 4/2007 | Nakamura et al. | |
| 2001/0042816 A1 | | 11/2001 | Fujimoto et al. | |
| 2005/0151978 A1 | | 7/2005 | Nakamura et al. | |
| 2006/0043275 A1 | | 3/2006 | Weber | |
| 2006/0268286 A1 | | 11/2006 | Cao et al. | |

FOREIGN PATENT DOCUMENTS

EP   1555561    7/2005
WO  2004/046642 A  6/2004

OTHER PUBLICATIONS

Breitmeier, "Lichtrastermikroskopie zur flaechigen Beurteilung von Oberflaechen,", 1148 Microtechnic No. 3, 1992, AGIFA, Verlag S.A. Zurich, CH, pp. 28-31, XP000312362.

* cited by examiner

*Primary Examiner*—Gregory J Toatley, Jr.
*Assistant Examiner*—Iyabo S Alli
(74) *Attorney, Agent, or Firm*—Greenblum & Bernstein, P.L.C.

(57) ABSTRACT

A noncontact form measuring apparatus emits a laser beam L. In the apparatus, a prism bends the laser beam into an X-axis direction, so that a Z-axis displacement of an objective optical system is converted by the prism into an X-axis displacement on a measurement coordinate system. A movement of an X-axis stage is converted into a Z-axis displacement on the measurement coordinate system. The apparatus moves an internal gear as a measurement object and the prism, reads X, Y, and Z coordinates at each focal point, and measures a three-dimensional form of inner teeth of the internal gear. The apparatus may translate the internal gear in a Y-axis direction, to measure a partial form of the inner teeth. The apparatus may turn the internal gear in an angular θ-direction, to measure a whole circumferential form of the inner teeth.

9 Claims, 6 Drawing Sheets

NONCONTACT SURFACE FORM MEASURING APPARATUS

BACKGROUND OF THE INVENTION

1. Field of the Invention

The present invention relates to a noncontact laser-based surface measuring apparatus.

2. Description of the Related Art

It is known that a laser-probe-based form measuring apparatus having a laser autofocusing function can widely measure the form and roughness of a precision part at a resolution of nanometers. For example, a noncontact form measuring apparatus disclosed in U.S. Pat. No. 7,209,242/EP1555561 measures an objective work on three-dimensional orthogonal coordinate axes X, Y, and Z by directing a laser beam onto a top face of the work, autofocusing the laser beam in a vertical (Z-axis) direction, scanning the work in the X- and Y-axis directions, detecting Z-axis movements of an objective optical system in an autofocusing optical system, and collecting data related to a surface form of the work based on the detected Z-axis movements.

According to the related art, the laser beam serves as a probe beam that is substantially a ray of light. The laser beam advances in parallel with an optical axis of the objective optical system, enters the objective optical system at a point out of the optical axis, and crosses the optical axis on a focal plane of the objective optical system. The position where the laser beam crosses the optical axis is positionally fixed to the objective optical system, and therefore, moving the objective optical system relative to the work in the Z-axis direction results in moving the position of the laser beam on the surface of the work in the X- or Y-axis direction. The laser beam reflected by the surface of the work is transmitted through the objective optical system and is detected by a position detector to detect a position of the reflected beam. From the detected position of the reflected beam, a positional deviation is measured between the surface of the work and the focal plane of the objective optical system. The measured positional deviation is feedback for autofocusing. From Z-axis positions of the objective optical system obtained through these steps, a surface form of the work is measured.

SUMMARY OF THE INVENTION

The related art emits a laser beam (laser probe) and passes the same through the objective optical system so that the laser beam may advance in the Z-axis direction onto the top surface of a work to measure. This configuration can measure only the top surface form of the work. Namely, the related art is incapable of measuring the form of an inner face of an object, e.g., the form of inner teeth of an internal gear.

According to the present invention, a noncontact form measuring apparatus capable of measuring the form of an inner face of an object can be provided.

According to a first technical aspect of the present invention, provided is a noncontact form measuring apparatus having an objective optical system configured to be movable in the direction of an optical axis, a laser source configured to emit a laser beam that is made incident, in parallel with the optical axis, to a noncentral point of the objective optical system, is transmitted through the objective optical system, is reflected by a measurement object, and is made incident as a reflected laser beam to the objective optical system, an optical position detector configured to receive the reflected laser beam transmitted through the objective optical system, and a focusing unit configured to move the objective optical system in the direction of the optical axis according to positional information provided by the optical position detector so that a focal point of the emitted laser beam is positioned on a surface of the measurement object. The noncontact form measuring apparatus includes a reflector arranged between the objective optical system and the measurement object and configured to reflect the laser beam transmitted through the objective optical system in an imaginary plane containing the laser beam and the optical axis, so that the reflector may reflect the laser beam transmitted through the objective optical system toward the measurement object and reflect the reflected laser beam from the measurement object toward the objective optical system.

According to a second aspect of the present invention, provided is a noncontact form measuring apparatus having a laser source configured to emit a laser beam, an objective optical system whose vertical optical axis is aligned with a Z-axis among three-dimensional orthogonal coordinate axes X, Y, and Z, the objective optical system being configured to be movable in the direction of the Z-axis, transmit the laser beam guided from the laser source in parallel with the vertical optical axis toward a focal point, and transmit the laser beam reflected by a surface of a measurement object in a direction parallel to the vertical optical axis, an optical position detector configured to receive the reflected laser beam transmitted through the objective optical system, and a focusing unit configured to move the objective optical system in the direction of the Z-axis according to a positional signal provided by the optical position detector so that a focal point of the laser beam may agree with the surface of the measurement object. The noncontact form measuring apparatus includes a reflector arranged between the objective optical system and the measurement object. The reflector has a reflection surface that reflects the laser beam transmitted through the objective optical system toward the focal point that is on a horizontal optical axis agreeing with the X-axis and reflects the reflected laser beam from the measurement object toward the objective optical system.

DESCRIPTION OF THE PREFERRED EMBODIMENT

First Embodiment

Figure 1:
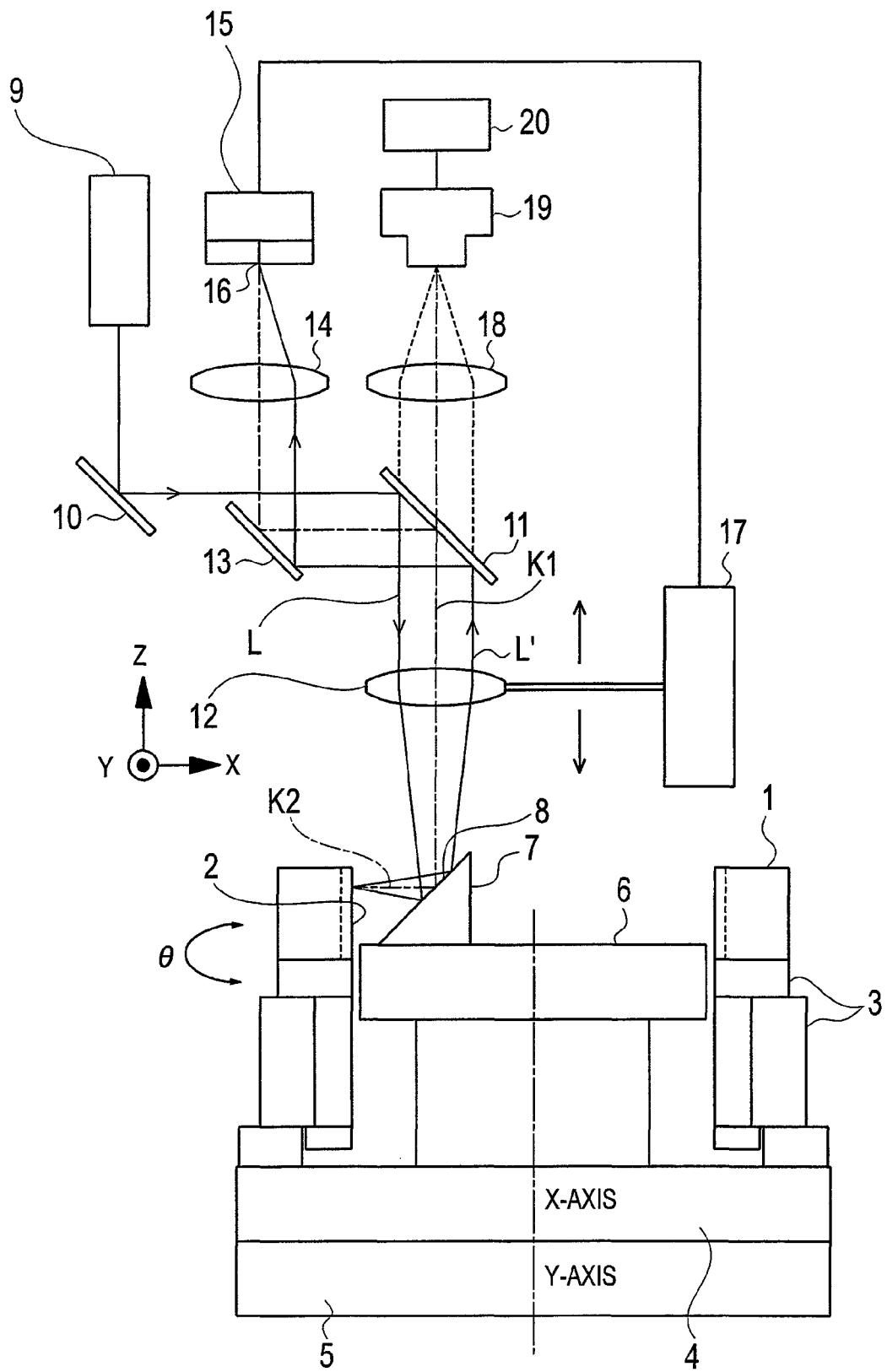
FIG. 1 is a schematic view illustrating a noncontact form measuring apparatus according to a first embodiment of the present invention.
Figure 2:
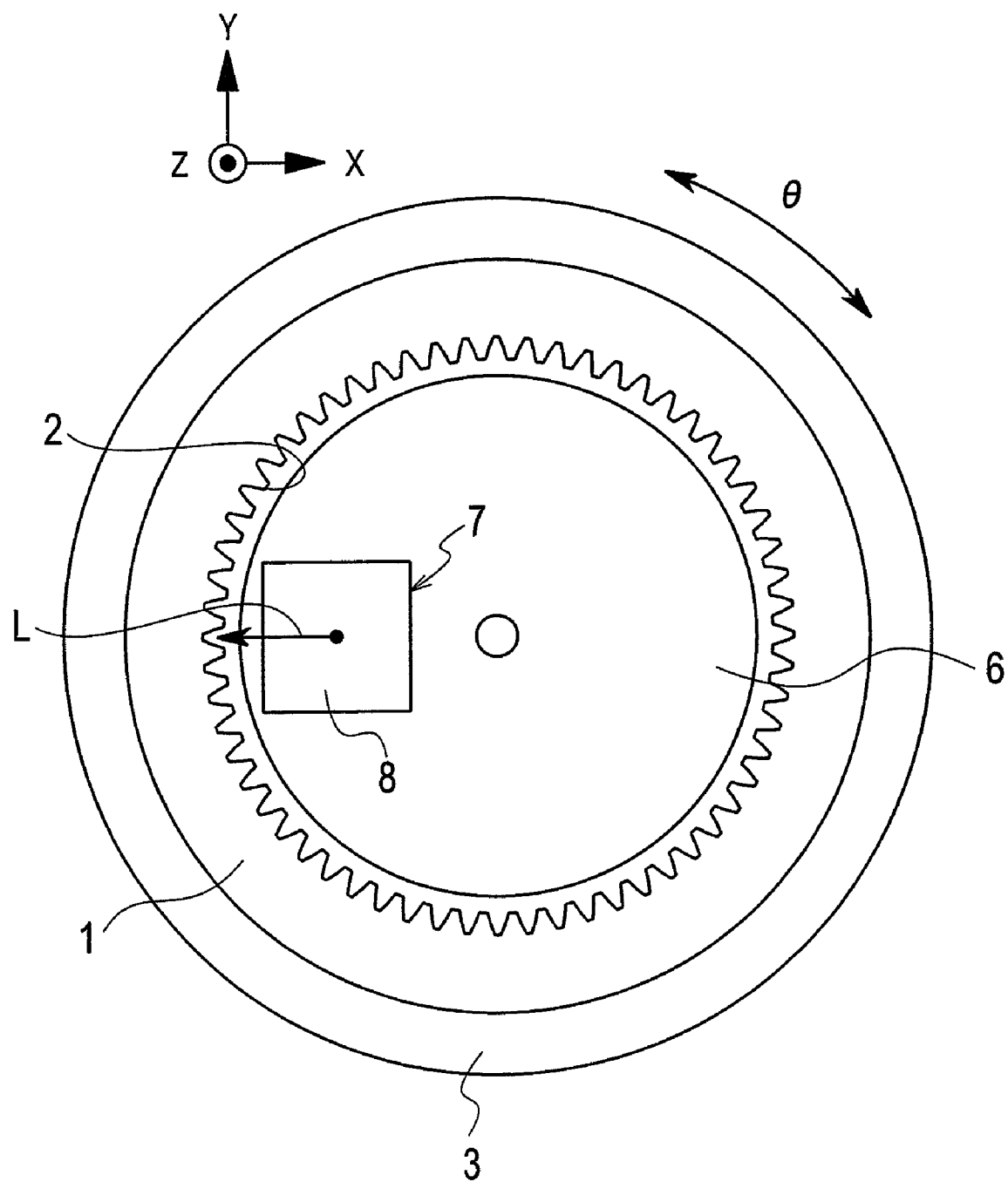
FIG. 2 is a plan view illustrating an internal gear serving as a measurement object and a rotary stage of the apparatus of the first embodiment.

FIGS. 1 to 6 are views illustrating a noncontact form measuring apparatus according to the first embodiment of the present invention. With reference to FIG. 1, a general configuration of the apparatus will be explained. In FIG. 1, X- and Y-axis directions are on a horizontal plane and are orthogonal to each other and a Z-axis direction is a vertical direction perpendicular to the X- and Y-axis directions.

According to the first embodiment, a measurement object or measurement work to be measured with the noncontact form measuring apparatus is an internal gear 1 having a ring shape. An inner surface of the internal gear 1 has inner teeth 2. The internal gear 1 is placed on a rotary stage 3 having a hollow structure similar to the internal gear 1. The rotary stage 3 is arranged on an X-axis stage (moving means movable in the X-axis direction) 4 that is capable of sliding in the X-axis direction (first direction). The X-axis stage 4 is arranged on a Y-axis stage (moving means movable in the Y-axis direction) 5 that is capable of sliding in the Y-axis direction (second direction).

Inside the hollow rotary stage 3, a circular center stage 6 is arranged on the X-axis stage 4. On the periphery of the center stage 6, a prism 7 serving as a reflector is arranged with a reflection surface 8 of the prism 7 outwardly oriented. The reflection surface 8 is slanted by 45 degrees and has a quadrilateral shape.

An autofocusing optical system of the apparatus will be explained. A laser source 9 is a semiconductor laser that emits a laser beam L. The laser beam L is a "probe" beam that is not spread about its transmitting path but is very fine such as a ray of light. The laser beam L from the laser source 9 is reflected by two mirrors 10 and 11 to become parallel to a vertical optical axis K1 that is parallel to the Z-axis. The laser beam L then enters an objective optical system 12.

The vertical optical axis K1 is of the objective optical system 12. From above the objective optical system 12, the laser beam L travels parallel with the vertical optical axis K1 and then runs through a noncentral part of the objective optical system 12. The laser beam L transmitted through the objective optical system 12 serves as a laser-probe and hits the reflection surface 8 of the prism 7.

The laser beam L reflected by the reflection surface 8 travels in the X-axis direction toward a focal point F that is on a horizontal optical axis K2 that is parallel to the X-axis, to hit an inner tooth 2 on the inner face of the internal gear 1. Since the laser beam (probe ray) L runs through a noncentral part of the objective optical system 12, the probe laser beam L runs in directions crossing the vertical optical axis K1 and horizontal optical axis K2, and at the focal point F, crosses the horizontal optical axis K2.

The laser beam L is then diffusely reflected by the inner tooth 2 of the internal gear 1 and a partial reflected laser beam L' is again reflected by the reflection surface 8. The reflected laser beam L' enters the objective optical system 12 from below the same. The laser beam L' then travels through the objective optical system 12 and advances in parallel with the vertical optical axis K1. The laser beam L runs in a vertical plane containing the X- and Z-axes, to hit an inner tooth 2 of the internal gear 1 obliquely relative to the horizontal optical axis K2. The laser beam L is reflected by the inner tooth 2 obliquely relative to the horizontal optical axis K2, to form the reflected laser beam L' in the same vertical plane. In the drawings, the reflected laser beam L' represents a main part of the whole of diffusely reflected laser beam.

The laser beam L' transmitted through the objective optical system 12 is reflected by two mirrors 11 and 13, travels through an imaging lens 14, and is received by an optical position detector 15.

The noncontact form measuring apparatus is configured so that, when the focal point F of the laser beam L agrees with the surface of an inner tooth 2, the reflected laser beam L' agrees with a center 16 of the optical position detector 15. If an optical barycenter of the laser beam L' disagrees with the center 16, the disagreement is corrected by a serve focusing unit 17 that moves the objective optical system 12 in a focusing direction (Z-axis direction). A movement of the objective optical system 12 during this autofocusing control is usable to measure a profile (irregularity) in a X-axis-direction of the inner tooth 2.

The mirror 11 is a half-mirror. With the mirror 11 and an imaging lens 18, a camera such as a CCD camera 19 can pick up an image of the measurement object. The image photographed by the camera 19 can be displayed on a monitor 20.

Figure 3:
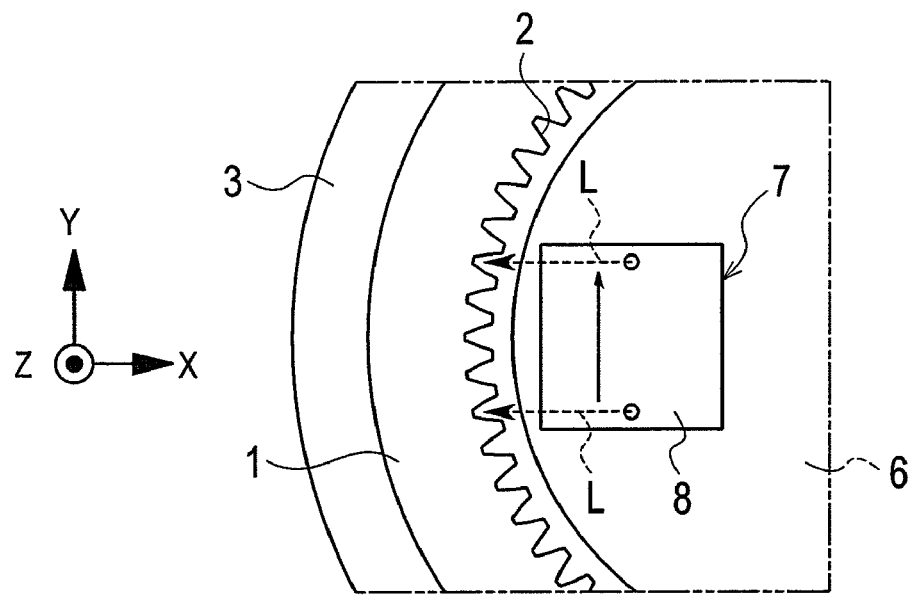
FIG. 3 is a plan view partly illustrating the internal gear of FIG. 2 translated in a Y-axis direction.
Figure 4:
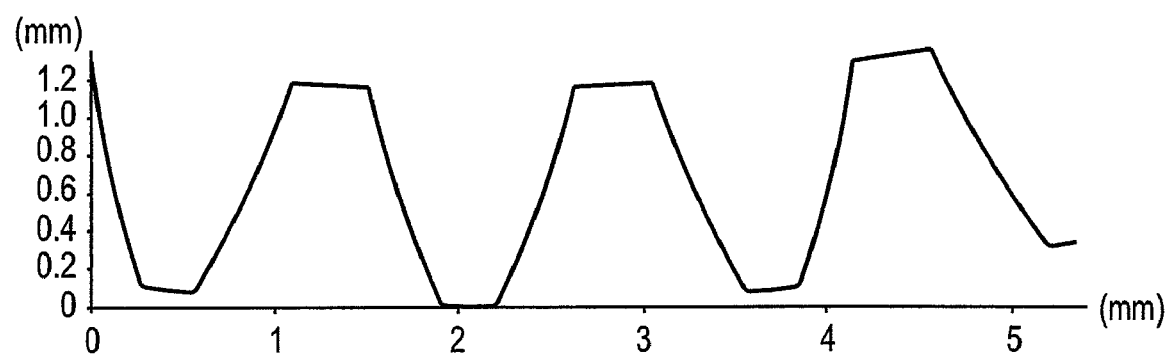
FIG. 4 is a graph illustrating a two-dimensional form of inner teeth of the internal gear measured by the apparatus of the first embodiment.

The internal gear 1 is placed on the Y-axis stage 5 through the rotary stage 3 and X-axis stage 4. When an inner tooth 2 of the internal gear 1 is irradiated with the laser beam L to conduct the autofocusing control, the internal gear 1 on the rotary stage 3 and X-axis stage 4 can be translated by the Y-axis stage 5 in the Y-axis direction. This results in scanning the laser beam L in the Y-axis direction within the range of the reflection surface 8, as illustrated in FIG. 3. Namely, within the range of the reflection surface 8, a two-dimensional form of the inner teeth 2 in the Y-axis direction is obtained as illustrated in FIG. 4.

Figure 5:
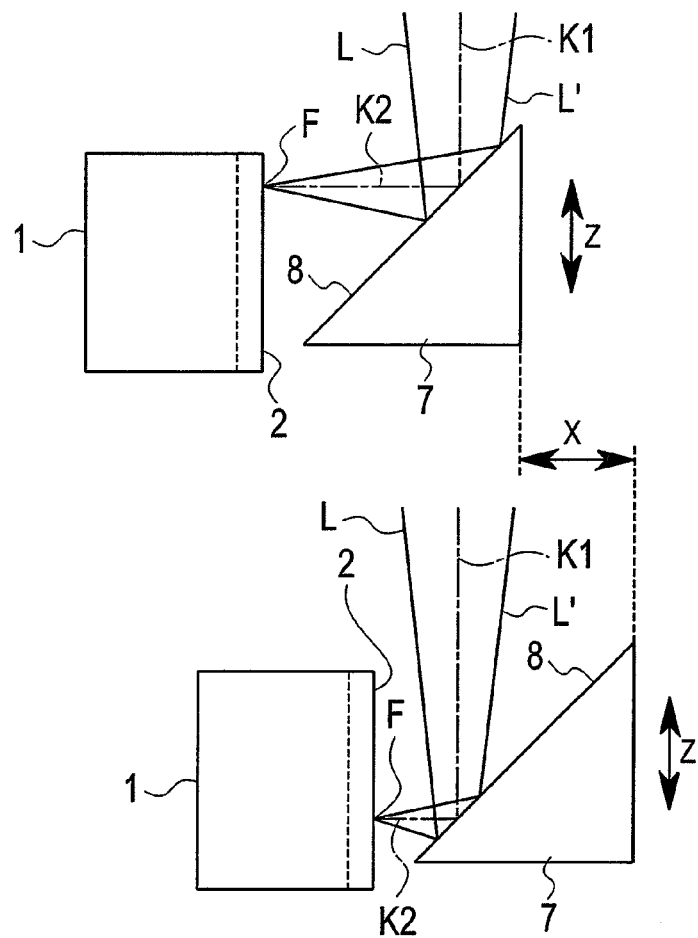
FIG. 5 is a view illustrating a prism of the apparatus of the first embodiment shifted in an X-axis direction.
Figure 6:
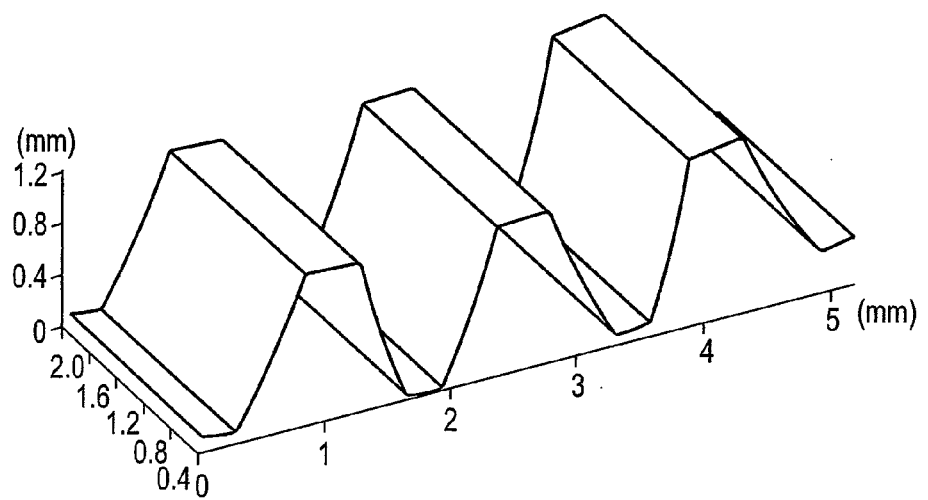
FIG. 6 is a graph illustrating a three-dimensional form of inner teeth of the internal gear measured by the apparatus of the first embodiment.

As illustrated in FIG. 5, the X-axis stage 4 can be used to move the prism 7 relative to the laser beam L in the X-axis direction. Since the reflection surface 8 of the prism 7 is inclined by 45 degrees, the laser beam L reflected by the reflection surface 8 vertically moves according to an X-axis movement of the prism 7 and hits an inner tooth 2. Namely, the laser beam L can vertically (in the Z-axis direction) scan an inner tooth 2 by moving the X-axis stage 4 in the X-axis direction. After each scanning of the inner teeth 2 in the Y-axis direction by moving the Y-axis stage 5 in the Y-axis direction, the horizontal optical axis K2 may be shifted in the Z-axis direction by moving the X-axis stage 4 in the X-axis direction. By repeating these profiling operations, a surface form of the inner teeth 2 can three-dimensionally be measured as illustrated in FIG. 6.

According to the first embodiment, the fine laser beam L serving as a laser probe is bent by the prism 7 into the X-axis direction. Namely, on the measurement coordinate system, a displacement of the objective optical system 12 along the Z-axis is converted by the prism 7 into a displacement along the X-axis and a movement of the X-axis stage 4 is converted by the prism 7 into a displacement along the Z-axis. Therefore, a three-dimensional form of the inner teeth 2 can be measure by moving both the internal gear 1 and prism 7 and by reading X, Y, and Z coordinates at each focal point.

According to the first embodiment, the laser beam L from the reflection surface 8 travels in the vertical plane containing the X- and Z-axes to hit an inner tooth 2 and the laser beam L' reflected by the inner tooth 2 travels in the same vertical plane. Due to this, the laser beam L surely hits the valley of each inner tooth 2, to correctly measure a form of the inner teeth 2.

Second Embodiment

Figure 7:
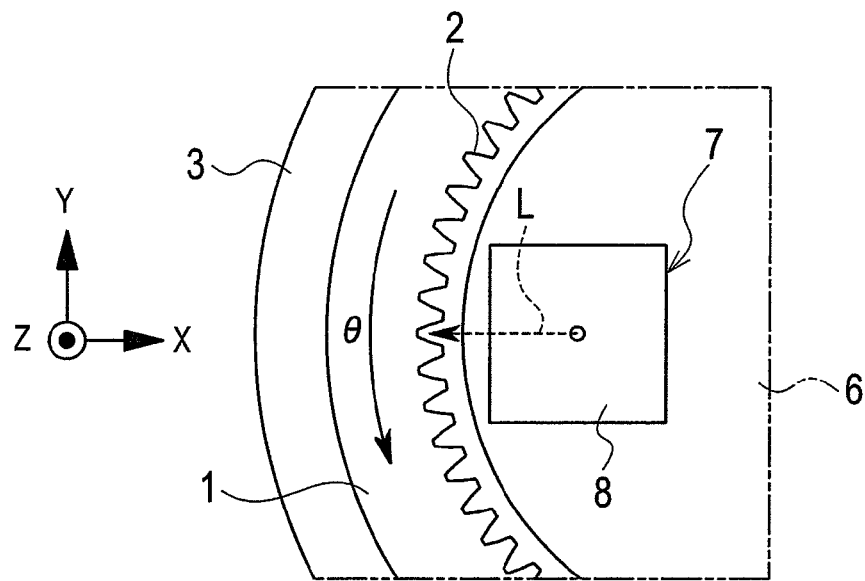
FIG. 7 is a plan view partly illustrating an internal gear serving as a measurement object and a rotary stage of a noncontact form measuring apparatus according to a second embodiment of the present invention.
Figure 8:
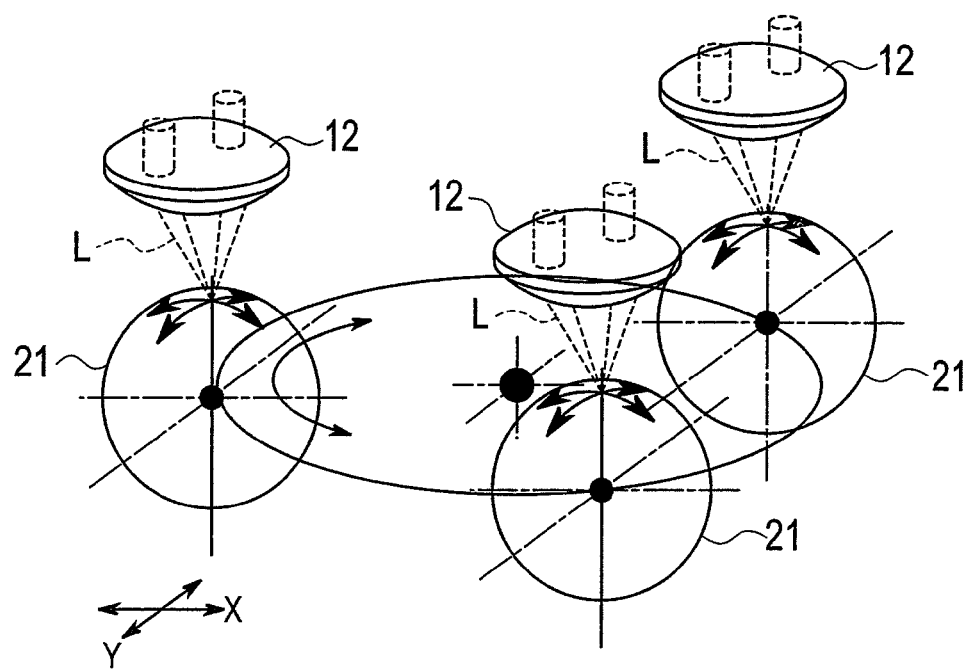
FIG. 8 is a view explaining a technique of finding a rotation center of the rotary stage of the second embodiment with the use of a reference sphere.
Figure 9:
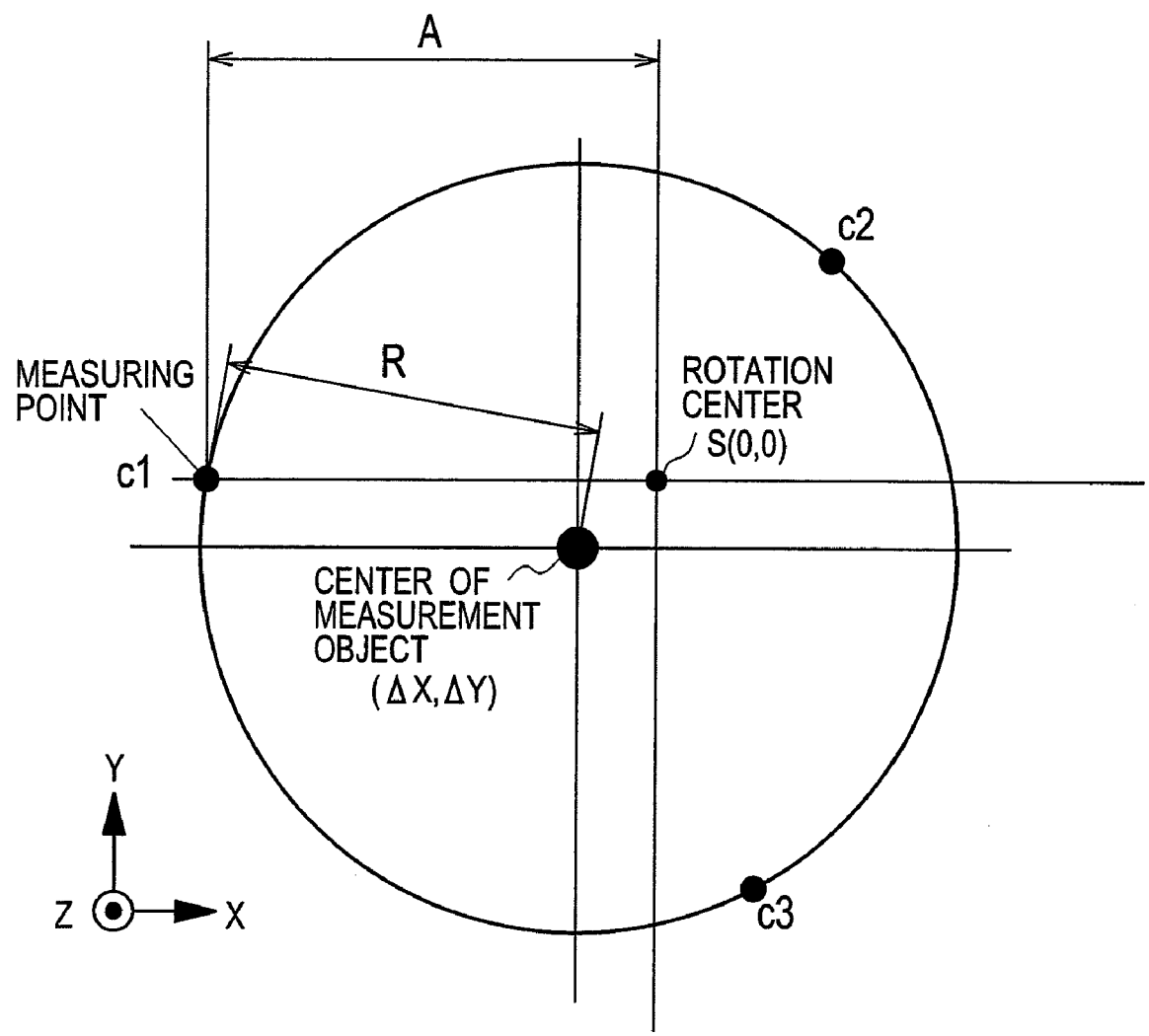
FIG. 9 is a view explaining a coordinate conversion according to the second embodiment.

FIGS. 7 to 9 illustrate a noncontact form measuring apparatus according to the second embodiment of the present invention. The structure of the second embodiment is the same as that of the first embodiment. The second embodiment differs from the first embodiment in measuring directions. In FIGS. 7 to 9, the same parts as those of the first embodiment are represented with the same reference marks to omit the explanations thereof.

According to the second embodiment, an internal gear 1, i.e., a measurement object is turned by a rotary stage 3 in an angular direction θ. According to the first embodiment, a measurement range is limited in front of the reflection surface 8 of the prism 7. According to the second embodiment, all inner teeth 2 are measurable.

At first, a reference sphere 21 is set at a part of the rotary stage 3 and is positionally fixed thereto. The rotary stage 3 is turned, and at each of optional three locations, an area around the apex of the reference sphere 21 is scanned from above with a laser beam L in X- and Y-axis directions, to find the position of a center of the reference sphere 21 at the location. Based on the found three center positions, a rotation center S of the rotary stage 3 is found.

A reflection surface 8 of a prism 7 is set in parallel with the Y-axis, and at a position where Y=0, is used to measure every tooth 2 with a laser beam bent by the prism 7 while the rotation stage 3 is being turned in the angular direction θ.

The measured data of the inner teeth 2 to a rotating coordinate system are converted into data on an XYZ coordinate system. Namely, the rotation center S of the rotary stage 3 obtained with the reference sphere 21 is set as (X, Y)=(0, 0) on a plane coordinate system. At least three points on an inner circumference of a ring gauge having a known radius of R are measured each at a position (A, 0) on the plane coordinate system. From center coordinates (ΔX, ΔY) of the ring gauge, the coordinate A of the position (A, 0) can be calculated by a relation of $A = \Delta X + \sqrt{(R^2 - \Delta Y^2)}$.

In this way, the position of the rotation center and the coordinates (A, 0) of a measuring point are obtained and the internal gear 1 is turned in the angular direction of θ (declination). Thereafter, the polar coordinate conversion is carried out to find radii of all teeth 2 of the internal gear 1. Like the first embodiment, the prism 7 is moved in the X-axis direction to vertically move the laser beam L. Consequently, an overall three-dimensional form of the teeth 2 is measured.

In each of the above-mentioned embodiments, a measurement object is an internal gear having a ring shape. This does not limit the present invention. For example, the present invention is applicable to measure the form of a cam or any other object, or the form of a side face of an arch-shaped object that hardly stands when measured. The prism 7 serving as a reflector may be replaced with a mirror.

Effect of the present invention will be explained. According to the present invention, the reflector reflects a laser beam (laser probe) traveling through the objective optical system into the direction of a horizontal optical axis. With this configuration, the noncontact form measuring apparatus of the present invention can measure the form of an inner face of a measurement object which may have an annular shape without changing the posture of the measurement object.

According to the present invention, the moving means movable in the Y-axis direction can translate the measurement object in the Y-axis direction relative to the laser beam reflected by the reflector. With this configuration, the noncontact form measuring apparatus of the present invention can measure a two-dimensional form of the measurement object.

According to the present invention, the moving means movable in the angular θ-direction can turn the measurement object in the θ-direction relative to the laser beam reflected by the reflector. With this configuration, the noncontact form measuring apparatus of the present invention can measure a two-dimensional form of the measurement object in the θ-direction.

According to the present invention, the moving means movable in the X-axis direction can translate the measurement object in the X-axis direction to shift the laser beam reflected by the reflector in the Z-axis direction. This X-axis moving means may be combined with the Y-axis moving means or the θ-direction moving means, to measure a three-dimensional form of the measurement object.

This application claims benefit of priority under 35 USC §119 to Japanese Patent Applications No. 2007-114460, filed on Apr. 24, 2007, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A noncontact form measuring apparatus having an objective optical system configured to be movable in the direction of an optical axis thereof, a laser source configured to emit a laser beam, the laser beam running in parallel with the optical axis, entering the objective system at a noncentral point off the optical axis, and being reflected by an inner face of a measurement object, a reflected laser beam entering the objective optical system, an optical position detector configured to receive the reflected laser beam traveling through the objective optical system, and a focusing unit configured to move the objective optical system in the direction of the optical axis according to positional information provided by the optical position detector so that a focal point of the emitted laser beam is positioned on an inner face of the measurement object, the noncontact form measuring apparatus comprising:

a reflector arranged between the objective optical system and the inner face of the measurement object and configured and positioned to reflect the laser beam traveling through the objective optical system in an imaginary plane containing the laser beam and the optical axis, so that the reflector reflects the laser beam traveling through the objective optical system toward the inner face of the measurement object and reflects the reflected laser beam from the inner face of the measurement object toward the objective optical system.

2. The noncontact form measuring apparatus of claim 1, further comprising:

a moving means configured to move the measurement object relative to the reflector in a direction orthogonal to the imaginary plane.

3. The noncontact form measuring apparatus of claim 1, further comprising:

a turning means configured to turn the measurement object about an axis perpendicular to an optical axis of the objective optical system passing through the measurement object.

4. The noncontact form measuring apparatus of claim 2, further comprising:

a second moving means configured to move the measurement object in parallel to an optical axis of the objective optical system passing through the measurement object.

5. The noncontact form measuring apparatus of claim 3, further comprising:

a moving means configured to move the measurement object in parallel to the optical axis of the objective optical system passing through the measurement object.

6. The noncontact form measuring apparatus of claim 1, further comprising:

the reflector reflects the laser beam traveling through the objective optical system into a first direction perpendicular to the optical axis of the objective optical system.

7. The noncontact form measuring apparatus of claim 6, further comprising:

a first moving means configured to move the measurement object relative to the reflector in a second direction perpendicular to the optical axis of the objective optical system and the first direction.

8. The noncontact form measuring apparatus of claim 7, further comprising:

a second moving means configured to move the measurement object relative to the reflector in the first direction.

9. The noncontact form measuring apparatus of claim 6, further comprising:

a turning means configured to turn the measurement object about a rotation axis that is parallel to the optical axis of the objective optical system and is positionally fixed to the first moving means.

* * * * *